United States Patent [19]

Yen

[11] Patent Number: 5,378,366
[45] Date of Patent: Jan. 3, 1995

[54] HOT LIME PRECIPITATION OF ARSENIC FROM WASTEWATER OR GROUNDWATER

[75] Inventor: Jeffrey H.-G. Yen, Woolwich, N.J.

[73] Assignee: Elf Atochem North America, Inc., Philadelphia, Pa.

[21] Appl. No.: 52,025

[22] Filed: Apr. 22, 1993

[51] Int. Cl.$^6$ .............................................. C02F 9/00
[52] U.S. Cl. ................................... 210/667; 210/668; 210/669; 210/677; 210/721; 210/724; 210/737; 210/758; 210/911
[58] Field of Search ................................ 210/667–669, 210/681, 688, 721, 724, 726, 758, 911, 912, 737, 677

[56] References Cited

U.S. PATENT DOCUMENTS

| | | | |
|---|---|---|---|
| 4,948,297 | 8/1990 | Fleming | 210/901 |
| 5,047,226 | 9/1991 | Schon | 210/758 |
| 5,114,592 | 5/1992 | Schuster et al. | 210/912 |

*Primary Examiner*—Ivars Cintins

[57] ABSTRACT

A process is disclosed wherein arsenic dissolved in wastewater or groundwater is removed from solution by precipitation thereof as calcium arsenate formed by the reaction of the arsenic with lime or hydrated lime in a heated solution at a pH of about 11 to about 13. It is preferred that the arsenic is first converted by oxidation to its pentavalent form.

16 Claims, 2 Drawing Sheets

HOT LIME PRECIPITATION OF ARSENIC FROM WASTEWATER OR GROUNDWATER

BACKGROUND OF THE INVENTION

This invention concerns a method for the efficient removal of arsenic from wastewater or groundwater in which it is dissolved, by the precipitation of a calcium salt thereof formed by contact in the solution with lime at elevated solution temperature, preferably after the arsenic is oxidized to a higher valency.

THE PRIOR ART

Precipitation of arsenic from aqueous solution with lime or hydrated lime is known. For example, U.S. Pat. No. 5,114,592 discloses, in Comparative Example 1, the precipitation of arsenic with hydrated calcium oxide from various effluents at pH of 10.5 to 11. In Comparative Example 2, Experiments B and C of the patent, arsenic was oxidized and precipitated with calcium hydroxide. The pH during precipitation was 9 and the duration was 45 minutes. In all experiments and examples of the patent, arsenic is precipitated from wastewater at room temperature (about 25° C.) using a lime precipitant. In column 5, at lines 17-19, the patentees state that calcium salts are not suitable for the precipitation of arsenic from waste based on the solubility range of calcium arsenate precipitated from both hot and cold solutions.

STATEMENT OF THE INVENTION

This invention is a process for the removal of dissolved arsenic from wastewater or groundwater contaminated therewith comprising precipitating said arsenic as calcium arsenate by reaction of said arsenic with lime or hydrated lime fed to the contaminated water in an amount sufficient to raise the pH of said water to between about 11 and about 13, continuing said reaction for a time sufficient to precipitate at least a major proportion of said calcium arsenate and at a temperature within the range of at least 35° to less than 100° C., and separating the filtrate from the precipitate. In its preferred form, the process includes the oxidation of the dissolved arsenic, prior to precipitation, from a lower valency to a higher valency by the addition to the groundwater of an inorganic oxidizing agent.

THE DRAWING

FIG. 1 is a block diagram of an embodiment of the process of this invention, and FIG. 2 is a diagrammatic representation of a continuous system utilizing continuously stirred tank reactors.

DETAILED DESCRIPTION OF THE INVENTION

Figure 1:
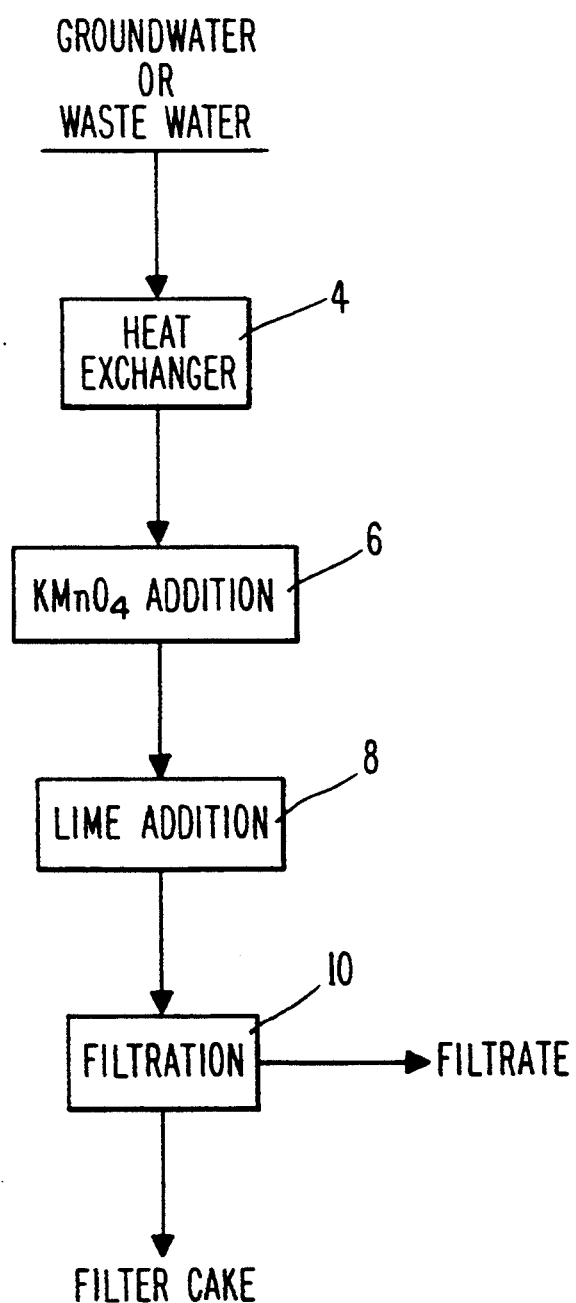

This invention is a process for the removal of arsenic from wastewater or groundwater in which it is dissolved, particularly from arsenic contaminated groundwater containing organic compounds. The contaminated solution (groundwater or wastewater) is treated with lime (CaO) or hydrated lime [Ca(OH)$_2$] in sufficient quantities to react with substantially all of the arsenic and to maintain the pH of the solution between about 11 and about 13. The arsenic generally exists as a water-soluble salt in the contaminated solution. In accordance with this process, the dissolved calcium and arsenic compounds react to form a calcium arsenate. The amount of lime or hydrated lime used may be expressed as the mole ratio of calcium to arsenic which is preferably from 1.5 to 5, more preferably from 1.75 to 3.5 moles of calcium per mole of arsenic. The addition of the lime to the contaminated aqueous solution will bring the pH of the groundwater up from the acid pH side to about 11 and above, under which conditions the calcium arsenate will precipitate.

Prior to treatment with lime, the arsenic in the solution is preferably oxidized to convert any arsenic that is in the trivalent form to the pentavalent form. Oxidizing agents, which are used for this purpose are the inorganic oxidizers including, for example, potassium permanganate, hydrogen peroxide, sulfuric acid, ozone, and the like. Potassium permanganate is preferred based on superior results. It is likely that potassium permanganate not only acts as an oxidizing agent but also enhances the precipitation efficiency. The oxidation reaction serves to make the arsenic more reactive and oxidizes the organics which may be present in the contaminated groundwater. The oxidizing agent is used in an amount sufficient to convert substantially all trivalent arsenic present in the solution to pentavalent arsenic. Preferably, an amount of oxidizing agent, expressed as the mole ratio of manganese to arsenic, used for the invention is 0.005 to 0.15 mole of manganese per mole of arsenic, more preferably from 0.01–0.12 mole per mole of arsenic. Equivalent amounts of other inorganic oxidizers will be effective.

Optionally, a flocculent may be added to the contaminated solution as it enters or after entering the reactor to thereby enhance separation of the precipitate. Flocculents are typically high molecular weight ionic polymers, such as Betz polymer 1100, 1110, 1115L, 116L, 1147L, 1154L and 1160X, produced by Betz Laboratories, Trevose, Pa.

The crux of the present invention is in the use of an elevated reaction temperature within the range of 35° C. (95° F.) up to less than 100° C. (212° F.). Preferably, the reaction temperature or temperature of the contaminated aqueous solution is from 40° C. (104° F.) up to about 70° C. (158° F.) during the precipitation reaction.

The precipitation reaction is carried out for a reactor residence time sufficient to remove the desired amount of arsenic. Preferably the reaction is continued between about 0.5 and about 5 hours, more preferably between 1 and 2 hours at the prescribed basicity and temperature.

While the process of this invention is effective for the removal of small amounts of (e.g. 10 ppm) arsenic from contaminated groundwater, it is highly beneficial for removing arsenic from heavily arsenic contaminated groundwater containing organics. Amounts of arsenic in the range of 100 to over 5000 parts per million, on a weight basis, in waste water are readily removed down to or below drinking water standards by the practice of this invention.

Various known finishing procedures may be used to further purify the aqueous product resulting from the process of this invention, if desired. Such techniques include post-treatment of the filtrate with activated alumina, activated carbon or by passage through ion-exchange resins. The flushing and/or regenerating solution from this post-treatment can be recycled back to the reactor thereby eliminating much of the waste associated with this process.

With regard to the Drawing, FIG. 1 is a flow diagram wherein industrial, surface or underground wastewater containing dissolved arsenic, typified by a chemical content tabulated as follows, is depicted as being treated in stages.

| Chemicals | Concentration, by weight |
|---|---|
| Arsenic | about 2000 ppm** |
| Calcium | about 600 ppm |
| Chloroform | 160 ppb*** |
| Chlorobenzene | 94 ppb |
| Alpha BHC* | 490 ppb |
| Gamma BHC | 740 ppb |
| Beta BHC | 95 ppb |
| Delta BHC | 410 ppb |

*BHC = benzene hexachloride
**ppm = parts per million parts of solution
***ppb = parts per billion parts of solution The pH of the contaminated groundwater was 5.5–5.7.

The groundwater 2 to be treated is heated by heat exchange means 4 and, as preferred, an inorganic oxidizing agent is incorporated into the groundwater solution at stage 6 to convert any trivalent arsenic ions in the solution to pentavalent ions. Following the oxidation, lime or hydrated lime is added at stage 8 over a period of 20 min. to 1 hour. The lime is dumped in as a solid (it can be in a powder form) or as an aqueous slurry to thereby maintain the pH value of the solution within the prescribed range of about 11 up to about 13 and to react with the arsenic to form calcium arsenate. The precipitation reaction continues at stage 8 for about 30 minutes to 2 hours to complete the arsenic removal. The reactor slurry is separated into phases at stage 10 in a conventional liquid/solid separator such as a filter. If post-treatment with calcium arsenate accepting solids is desired, the liquid phase formed in stage 10 may be passed through the solid or solids, e.g., activated alumina, activated carbon or ion exchange resins, at this point. The filter cake (solid precipitate) may be further processed (e.g. chemical fixation, solidification, etc.) and then disposed of according to governmental regulations.

Figure 2:
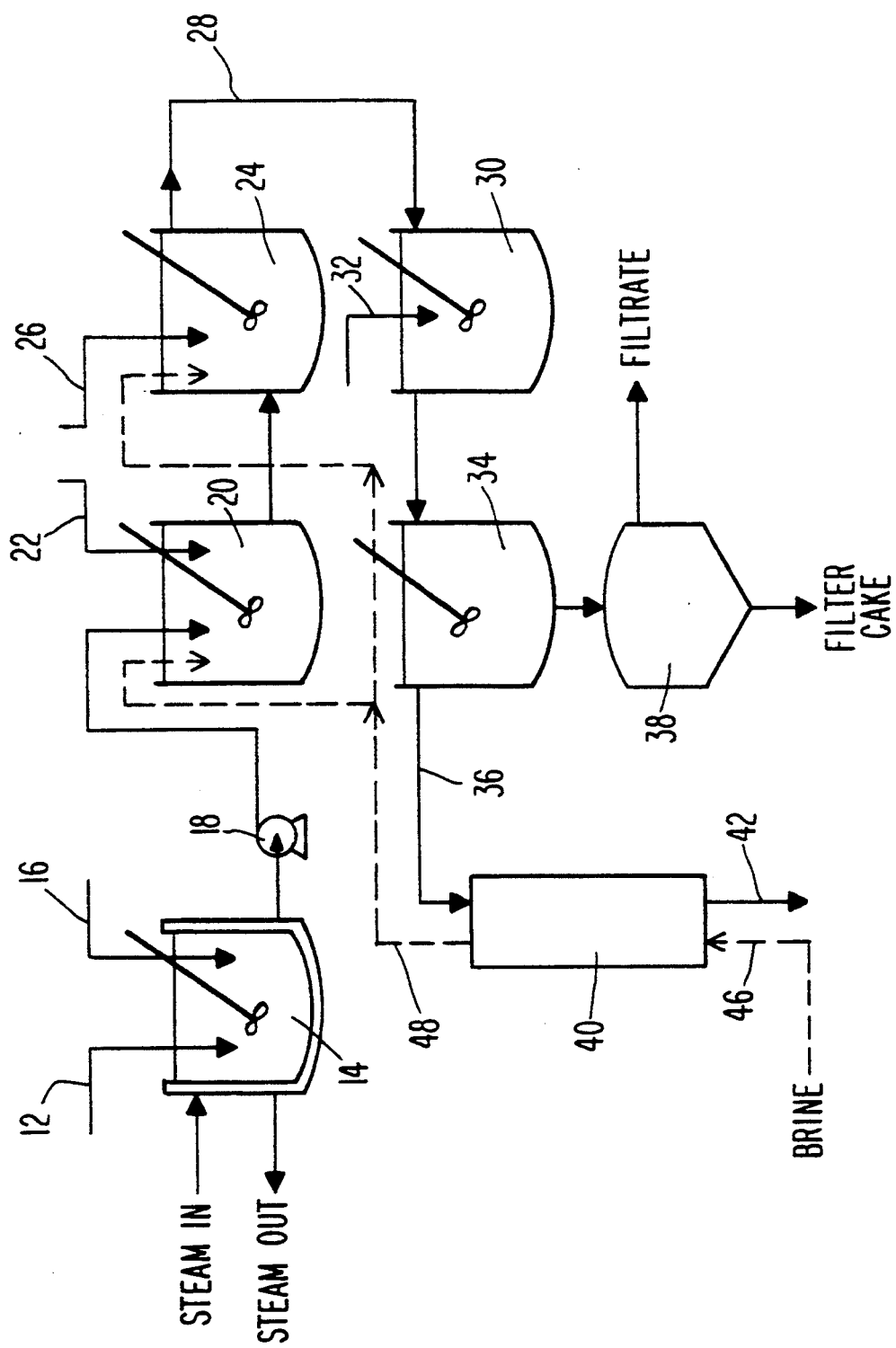

In FIG. 2, a continuous process is shown wherein arsenic contaminated groundwater, e.g., as tabulated above, is passed through line 12 and heated in steam jacketed or coiled stirred vessel 14. An inorganic oxidizing agent is incorporated into the stirred vessel through line 16 and converts trivalent arsenic ions present in the solution to pentavalent ions. When the contaminated oxidized groundwater is at the appropriate elevated temperature (at least 35° C.) in vessel 14, the solution is pumped via pump 18 into continuously stirred tank reactor (CSTR) 20 which may also be steam jacketed or coiled (as vessel 14) to keep the solution heated. Lime powder or slurry is passed into CSTR 20 through line 22 and the precipitation begins as the pH exceeds about 11. Stirring is continued to promote the reaction and to keep the slurry from settling. To maintain a continuous reaction and thereby complete precipitation, the slurry of calcium arsenate, from the bottom of CSTR 20, is passed into CSTR 24 where more lime, in the form of powder or an aqueous slurry, may be charged to CSTR 24 through line 26 to maintain the desired pH and precipitate additional arsenic from solution. CSTR 24 may also be steam jacketed or coiled (as vessel 14) to continue heating the solution. Overflow will pass from CSTR 24 through line 28 into stirred flocculation tank 30. Aqueous flocculent solution (0.1–1.0% conc.) is added to tank 30 via line 32. Flocculated slurry passes from tank 30 into settling tank 34. The treated water leaving tank 34 as overflow at 36 should meet the arsenic specification of the national drinking water standards. As the slurry in tank 34 thickens, it is removed at the bottom of the tank and passes into a conventional liquid-solid separator 38 where the filtrate is returned to the ground, passed to storage, recycled back to the system or further treated, for example, by passage through purification agents such as activated carbon, activated alumina, ion exchange resins, and the like. The flushing and regeneration solution from this post-treatment can be recycled back to the CSTR reactor system thereby eliminating the waste associated with the post-treatment process. The wet solid precipitate may be disposed of after chemical fixation and solidification, as well known in this art.

Optionally, ion exchange column(s) 40 can be installed after tank 34 to lower the total dissolved solid (TDS) content in stream 36 if the TDS content should become a concern. Calcium and magnesium should be among the major attributes to the high TDS in stream 36. The removal of the hardness ions $Ca^{+2}$ and $Mg^{+2}$ can be achieved with a strong acid cation exchanger in the $Na^+$ form. The strong acid cation resins can be regenerated periodically with 5–20% brine solution 46. The regenerant 48 containing $Ca^{+2}$ and $Mg^{+2}$ can be recycled back to reactor 20 or 24. Alternatively, a swing ion exchange system can be used, in which one column is used for hardness removal while the other column is being regenerated. After a period of time, the operating mode for the columns can be switched from adsorption to regeneration and vice versa. Such an option can improve the overall lime utilization efficiency and lower the TDS content in the process effluent 36.

The following examples are set forth to demonstrate this invention.

EXAMPLE 1 (COMPARISON)

One thousand grams (1000 g) of groundwater (as tabulated heretofore) was pour into a stirred glass reactor and lime (CaO) was added to the groundwater in the reactor to adjust the pH. The groundwater temperature was 20° C. After about 30 minutes, the reactor slurry was filtered. Several experimental runs were conducted under these conditions except for the amount of CaO that was added. The results of these runs are reported in the following table.

TABLE

| | Run No. 1 | Run No. 2 | Run No. 3 | Run No. 4 |
|---|---|---|---|---|
| Lime added, g's | 2.0 | 4.0 | 6.0 | 8.0 |
| pH after lime addition | 11.4 | 12.4 | 12.5 | 12.5 |
| Arsenic in filtrate, ppm by wt. | 18.4 | 3.1 | 3.5 | 3.2 |

EXAMPLE 2 (COMPARISON)

1000 g of groundwater (as tabulated hereinbefore) was poured into a stirred glass reactor and 0.5 g of potassium permanganate was added to the groundwater in the reactor. About 3 g of lime was then added to the reactor to adjust the groundwater pH to about 12. The reaction was allowed to proceed for about 60 minutes at 19° C. The arsenic concentration in the filtrate was found to be 0.31 ppm.

EXAMPLE 3 (COMPARISON)

1500 g of groundwater (as tabulated hereinbefore) was poured into a stirred glass reactor and 0.05 g of potassium permanganate was added to the groundwater in the reactor. About 6 g of lime was then added to the groundwater to adjust the pH of the reaction medium to 12. The reaction was conducted for about 60 minutes at about 48° C. The resulting reactor slurry was then filtered and the arsenic concentration in the filtrate was determined to be 1.09 ppm.

EXAMPLE 4

3000 g of groundwater (as tabulated hereinbefore) was poured into a stirred glass reactor and 1.5 g of potassium permanganate was added to the groundwater in the reactor. About 16.5 g of lime was then added to the reactor to adjust the pH of the reaction medium to 11.3. The reaction was allowed to proceed for about 120 minutes at about 43° C. The resulting reactor slurry was filtered and the arsenic concentration of the filtrate was determined to be less than 0.01 ppm.

EXAMPLE 5

3000 g of groundwater (as tabulated hereinbefore) was poured into a stirred glass reactor and 0.5 g of potassium permanganate was added to the groundwater in the reactor. About 19 g of lime was then added to the reactor to adjust the pH of the reaction medium to 11.2. The reaction was allowed to continue for about 60 minutes at 46° C. The resulting reactor slurry was filtered and the amount of arsenic remaining therein was determined to be less than 0.01 ppm.

EXAMPLE 6

The process of this invention was carried out continuously by passing a contaminated aqueous solution (influent) having 2100 ppm (by weight) of arsenic dissolved therein through a dual continuously stirred tank reactor (CSTR) system wherein the CSTR's were arranged in sequence. The influent flowed at a rate of 0.5 gallons per minute for a residence time in each CSTR of about 60 minutes. Potassium permanganate in an amount of about 0.1 mole of manganese per mole of arsenic was added to the influent tank at a temperature of about 160° F. with a residence time of about 2 hours before it was passed completely through the system. Powdered lime was continuously added to both CSTR's during the continuous run in an amount sufficient to maintain the influent pH in the first reactor at about 11 and in the second reactor at about 11.4. The first and second reactors were operated at temperatures of 120° F. (48.9° C.) and 100° F. (37.8° C.) respectively. The slurry from the second reactor, after 60 minutes residence was continuously filtered and the filtrate collected. Four samples were tested over a period of eight hours and the arsenic content found to be 0.091, 0.197, 0.057 and 0.062 ppm in order of sample collection.

It is apparent from the results of Example 1 that precipitation of arsenic with lime from contaminated groundwater is not sufficiently effective when the process is carried out at ambient temperature. It is further apparent from the results of Example 2 that oxidation of the arsenic ion to a higher valency improves arsenic removal but not sufficiently to readily meet drinking water standards. Example 3 shows that the oxidizing agent, even at elevated temperatures, must be used in effective amounts to obtain a product of drinking water purity. Examples 4, 5 and 6 demonstrate the effectiveness of the present invention which is unexpected in view of the prior art.

I claim:

1. A process for the removal of dissolved arsenic from wastewater or groundwater contaminated therewith comprising precipitating said arsenic as calcium arsenate by reaction of said arsenic with lime or hydrated lime fed to the contaminated water in an amount sufficient to raise the pH of said water to at least 11, continuing said reaction for a time sufficient to precipitate at least a major proportion of said calcium arsenate and at a temperature within the range of 35° to less than 100° C., and separating the purified water from the precipitate.

2. The process of claim 1 wherein the dissolved arsenic is oxidized to a higher valency by the addition to the contaminated water of an inorganic oxidizing agent.

3. The process of claim 2 wherein the contaminated water also contains organic compounds.

4. The process of claim 2 wherein the oxidizing agent is potassium permanganate.

5. The process of claim 4 wherein the oxidizing agent is added in an amount, expressed as the mole ratio of manganese to arsenic, ranging from 0.005 to 0.15 mole of manganese per mole of arsenic.

6. The process of claim 1 wherein the reaction time ranges from about 0.5 to about 5 hours.

7. The process of claim 1 wherein the separated purified water is passed through an acid cation exchange resin in the alkali metal form to reduce the total dissolved solids therein.

8. The process of claim 7 wherein the cation exchange resin is a strong acid cation exchange resin in the sodium form.

9. The process of claim 7 wherein the spent cation exchange resin is regenerated with a brine solution.

10. The process of claim 9 wherein the brine solution is an aqueous solution of sodium chloride at a weight concentration of from about 5 to about 20%.

11. The process of claim 9 wherein the regenerant from the regenerated cation exchange resin is sent to the reaction stage of said arsenic with lime or hydrated lime.

12. A process for the removal of dissolved arsenic from wastewater or groundwater contaminated with at least 500 parts per million of arsenic and over 100 parts per billion of organic compounds which comprises oxidizing trivalent arsenic to pentavalent arsenic, precipitating said arsenic as calcium arsenate by reaction of said arsenic with lime or hydrated lime fed to the contaminated water in an amount sufficient to raise the pH of said water to between about 11 and about 13 continuing the reaction at the raised pH for a time ranging from about 1 to about 2 hours and at a temperature within the range of 40° to about 70° C., and separating the purified water from the precipitate.

13. The process of claim 12 wherein the dissolved arsenic is oxidized by treatment with potassium permanganate in an amount, expressed as the mole ratio of manganese to arsenic, ranging from 0.005 to 0.15 mole of manganese per mole of arsenic.

14. The process of claim 12 wherein the separated purified water is passed through a strong cation exchange resin in the sodium form.

15. The process of claim 14 wherein the spent cation exchange resin is regenerated with an aqueous solution of sodium chloride at a weight concentration of from about 5 to about 20%.

16. The process of claim 15 wherein the regenerant from the regenerated cation exchange resin is sent to the reaction stage of said arsenic with lime or hydrated lime.

* * * * *